(12) United States Patent
Hansen

(10) Patent No.: US 7,225,958 B2
(45) Date of Patent: Jun. 5, 2007

(54) EXTERNAL STORAGE STRUCTURE

(75) Inventor: David N. Hansen, Sterling Heights, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 541 days.

(21) Appl. No.: 10/855,611

(22) Filed: May 26, 2004

(65) Prior Publication Data

US 2005/0274763 A1  Dec. 15, 2005

(51) Int. Cl.
  *B60R 9/00* (2006.01)
(52) U.S. Cl. ............. 224/547; 224/548; 224/567; 224/543
(58) Field of Classification Search ........... 224/547, 224/488, 511, 522, 555, 557, 527, 566, 543, 224/539, 567, 569, 533, 535, 548
See application file for complete search history.

(56) References Cited

U.S. PATENT DOCUMENTS

| 4,256,245 | A | * | 3/1981 | Serres .................. 224/547 |
| 4,930,694 | A | * | 6/1990 | Yoshitake et al. ........ 224/547 |
| 5,035,389 | A | * | 7/1991 | Wang ................ 248/224.51 |
| 5,727,642 | A | * | 3/1998 | Abbott ................. 180/65.1 |
| 6,036,071 | A | * | 3/2000 | Hartmann et al. ........ 224/547 |
| 6,422,629 | B2 | * | 7/2002 | Lance et al. ............ 224/403 |
| 7,044,344 | B2 | * | 5/2006 | Winkler ............... 224/546 |

* cited by examiner

*Primary Examiner*—Nathan J. Newhouse
*Assistant Examiner*—Margaret Olson
(74) *Attorney, Agent, or Firm*—David L. Kuhn; Thomas W. Saur; Luis Miguel Acosta

(57) ABSTRACT

A storage container system for mounting a storage box on the exterior of a vehicle has trapezoidal members attached to the vehicle that mate with and hold U-shaped members mounted on the container to be carried. The system has a handle mounted on the box which holds the U-shaped member in contact with the trapezoidal member when the box is in a locked position for vehicle movement and a tab that will partially separate the U-shaped member from the trapezoidal member when the handle is rotated.

1 Claim, 4 Drawing Sheets

EXTERNAL STORAGE STRUCTURE

GOVERNMENT INTEREST

The invention described here may be made, used and licensed by the United States for governmental purposes without paying me any royalty.

BACKGROUND OF THE INVENTION

In one aspect this invention relates to storage containers for use with military vehicles. In yet a further aspect this invention relates to removable, external vehicle storage.

Storage is always a problem with military vehicles which must carry a substantial amount of material because of difficult and sporadic resupply. Thus it is desirable to have means to carry additional supplies. One common solution is to provide additional storage boxes attached to the outside of the vehicle. Such boxes can be used to store many miscellaneous items useful for crew, vehicle maintenance, supplies, etc. Considerations for a proper mounting system would include the ability to firmly hold the box in position during off road usage and to easily remove the box from its mountings even when the box and mountings have been exposed to weather and are covered with mud.

The box attachment system according to this invention will firmly hold a box on the vehicle's exterior surface and will break loose from its mountings to allow box removal when desired.

SUMMARY OF THE INVENTION

A storage container system of the present invention is adapted for mounting and storing supplies on the extensions or ledges common on military vehicles of the present generation or vertically on the sides of a vehicle or trailer. The mounting system has a plurality of trapezoidal projections mounted on the vehicle which provide a mounting means. The trapezoidal projections have a base portion juxtaposed to the vehicle surface on which the trapezoidal projections mounted, and a raised portion extending from the base portion, the raised portion having a larger cross section than the base.

A storage box according to this invention is adapted to be attached to the trapezoidal projections so as to hang from the trapezoidal projections. The box has a plurality of inverted U-shaped brackets attached to one side of the storage box; the U-shaped brackets are coaxially aligned. The inverted U-shaped brackets having two arms and a connecting section are formed with a lip extending inwardly from the inner edge of the U-shaped bracket to form a cross sectional area complimentary to the base portion of the trapezoidal projection. The inverted U-shaped bracket has an aperture extending through its connecting section to allow the passage of a tab through the inverted U-shaped bracket to contact the base portion of the trapezoidal member. The storage box also has at least one stud having an enlarged head mounted on the box to guide an ejector.

The ejector is mounted on the box in such a manner that it can move between a locking position which holds the box securely on the vehicle and an unlocking position where the box can be lifted free of the vehicle. The ejector has a tab that extends from the ejector, the tab being coaxially aligned with the aperture in the inverted U-shaped bracket. The tab is displaced from the inverted U-shaped bracket when the ejector is in the locking position and passes through the aperture to contact the trapezoidal member's base when the ejector is in the unlocking position. The ejector also has a bifurcated extension which extends from the ejector, the bifurcated extension forming a slot which engages the stud at all times to guide the ejector. The ejector has a locking bar positioned on the ejector so as to engage the trapezoidal member's base portion and the free ends of the U-shaped bracket when the ejector is in the locking position.

A handle is rotatably mounted on the box and attached to one end of the ejector so that when the handle is rotated it will move the ejector between the locking and unlocked position.

DETAILED DESCRIPTION

Figure 1:
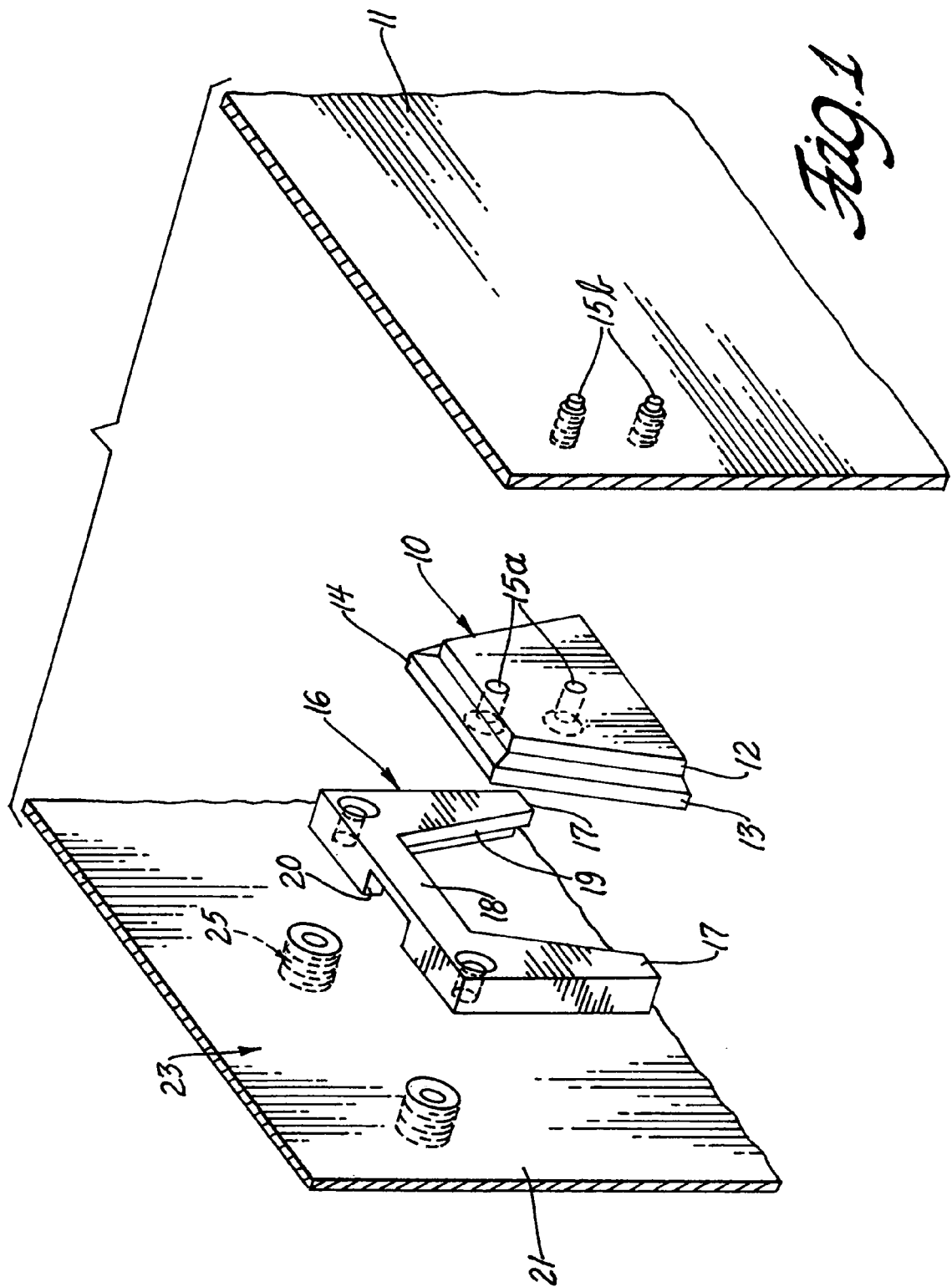
FIG. 1 is a perspective exploded view of a catch mechanism of this invention.

The mounting system of this invention includes a two part catch mechanism including a male fitting attached to vehicle or trailer. The catch mechanism has a complimentary U-shaped female catch mechanism attached to the box to be mounted on the vehicle. Referring to the accompanying drawing wherein like numerals refer to like parts, a storage container system according to the present invention has a plurality of trapezoidal shaped male projections 10 mounted on a vehicle wall that provides a surface for mounting the trapezoidal projections. The trapezoidal projections 10 have a base portion 12 attached to the vehicle surface 11 and a relatively larger raised portion 14 overlaying and extending outward from the base portion as a lip extending outward forming a head on the trapezoidal projection. The connection between base portion 12 and raised portion 14 is an inclined surface 13 that forms a cam surface. The trapezoidal projection 10 has a plurality of apertures 15a, which correspond to a plurality of apertures 15b, formed in the vehicle wall. The trapezoidal projection 10 can be attached using standard fastening means such as rivets bolts and nuts or the apertures 15b can be threaded and bolts passed through the trapezoidal projection and tightened into wall 11 to secure the trapezoidal projection in place.

The female, U-shaped, bracket 16 is formed with a pair of arms 17 connected by a base portion 18. U-shaped brackets 16 are formed with a lip 19 on the inner edge of the arms and base, the lip extending inwardly into the opening formed in the center of the U-shaped bracket by the arms and base. This creates a reduced cross sectional area that is complimentary to the base 12 of the trapezoidal projection 10 and a relatively larger opening below the lip which corresponds in shape and size to the enlarged portion 14 of the trapezoidal projection 10. The U-shaped bracket 16 has an aperture 20 formed through its base 18 where the bracket 16 contacts a surface 21 on a storage box 23 designed to be mounted on the vehicle 11. Like the trapezoidal projection 10 the U-shaped bracket can be mounted to the storage box 23 using various fasteners such as rivets or bolts, in the present drawing threaded bosses 25.

A plurality of the U-shaped brackets 16 are disposed on one side of the storage box 23 in axial alignment, two U-shaped brackets being shown in the drawing. The number of brackets can be increased to provide further load carrying capacity or if the box has sufficient width the plurality of brackets could be arranged in two or more sets of axially arrayed brackets for increased capacity. A corresponding plurality of trapezoidal projections 10 will be attached to the vehicle extension so as to provide means to mount the box 23 via brackets 16 onto the corresponding trapezoidal projections 10.

In addition to the plurality of U-shaped brackets, the storage box 23 has at least one stud 22 formed with an enlarged head 29 mounted on a post 27 that is affixed to box 23.

Figure 3:
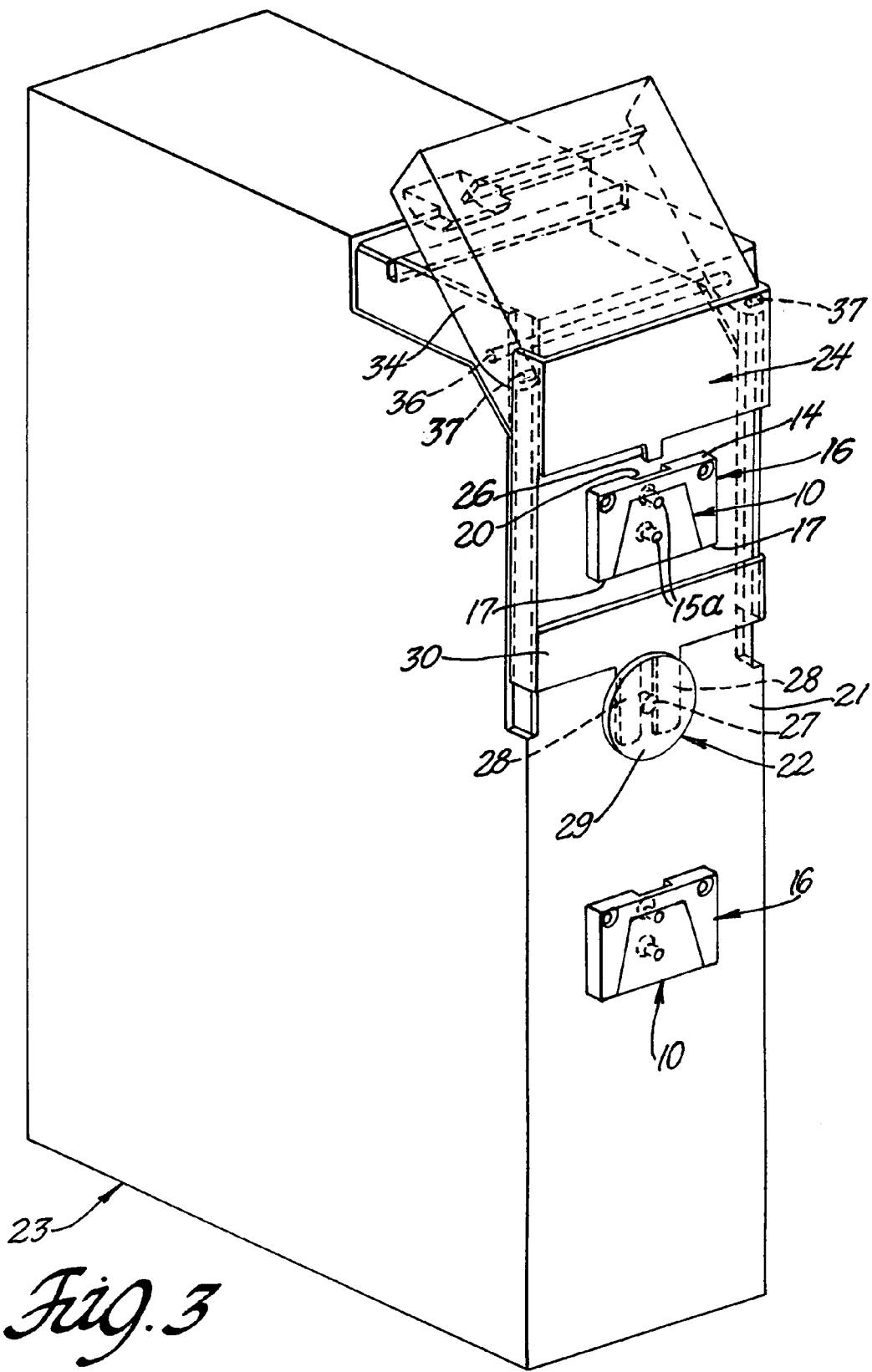
FIG. 3 is the structure of FIG. 2 in a partially opened position.
Figure 4:
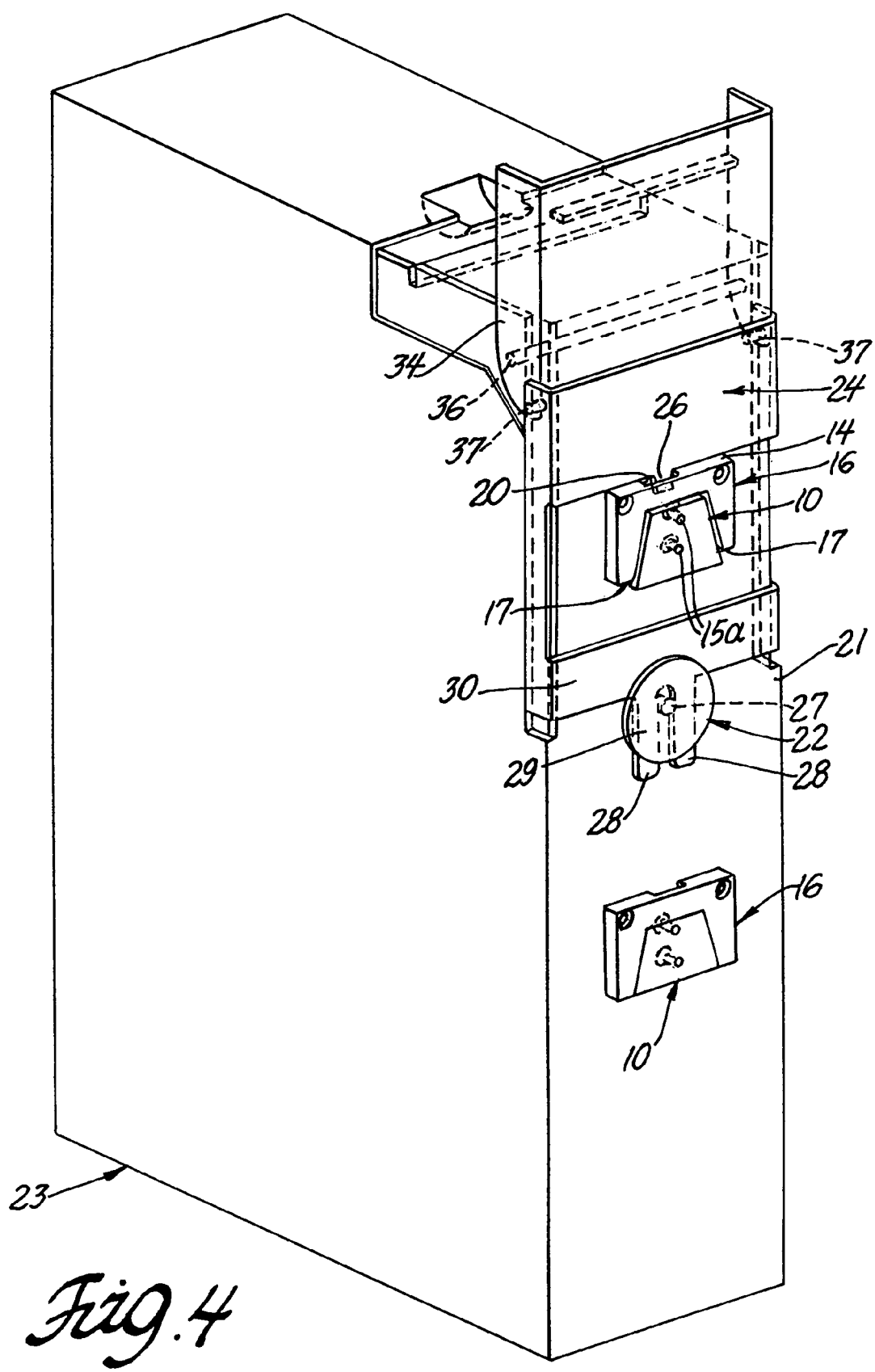
FIG. 4 is the structure of FIG. 2 in an open position.

The storage box 23 has an ejector 24 mounted on the box, the ejector being mounted to the box in such a manner that it can move between a locking position which holds the box securely on the vehicle and an unlocking position where the box can be lifted free of the vehicle. The ejector 24 has a tab 26 that extends outward from the ejector, the tab being coaxially aligned with the aperture 20 in the U-shaped bracket 16. The tab 26 is spaced from the U-shaped bracket when ejector 24 is in the locking position and passes through aperture 20 to contact base 14 of the trapezoidal member 10 when the ejector is in the unlocking position. The ejector 24 has a bifurcated extension, comprising two legs, 28 that extends from the ejector. The legs 28 form a slot that passes under the enlarged head 29 and engage the post 27 when ejector 24 is moved to the unlocking position as shown in FIGS. 3 and 4. The legs 28, extending under the enlarged head 29 as the ejector 24 moves to the unlocking position, help maintain the ejector in position and moving along the surface of the box 23. The legs 28 help keep the tab 26 coaxially aligned with aperture 20 so that the locking mechanism as a whole functions smoothly.

Figure 2:
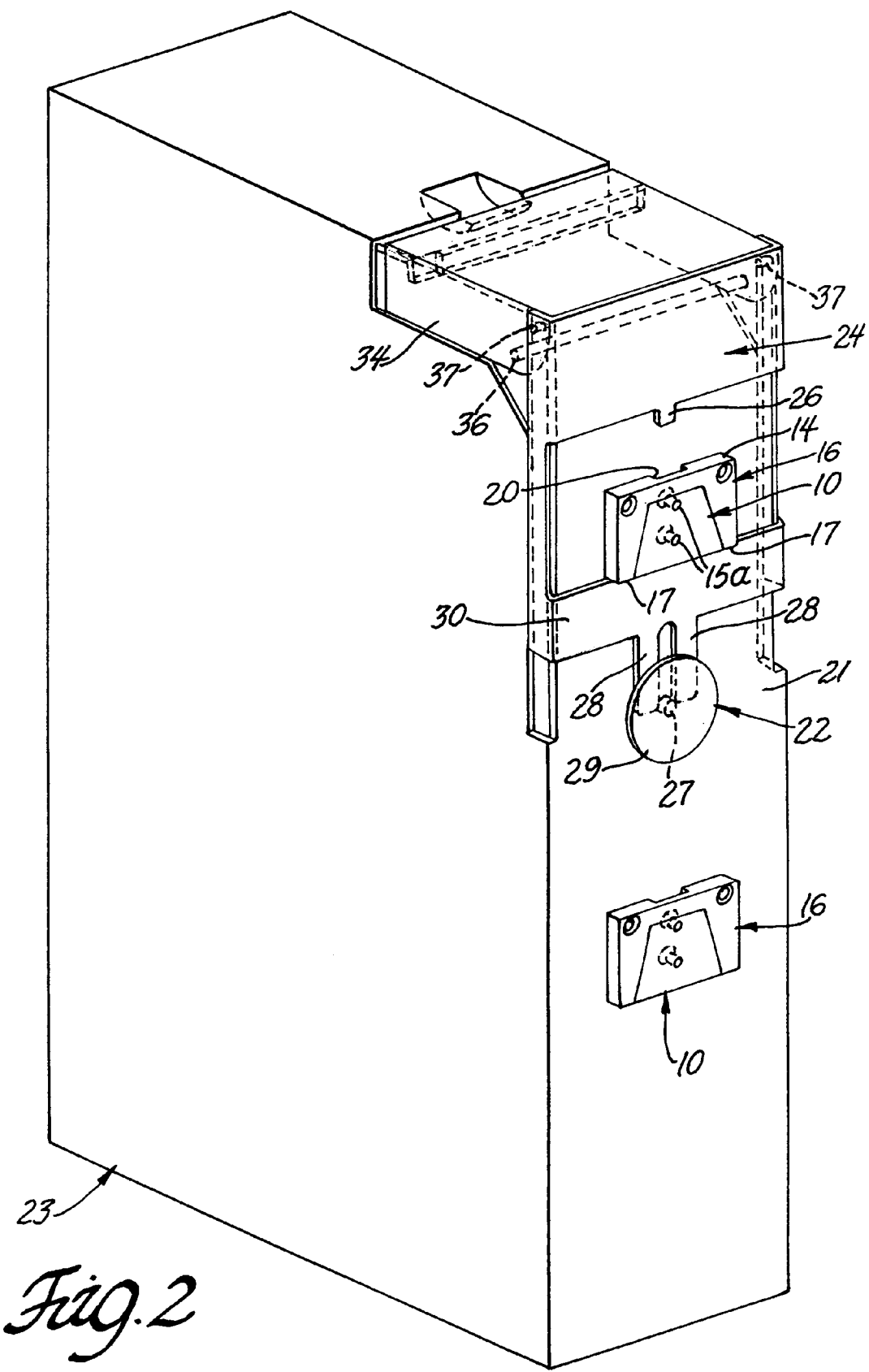
FIG. 2 is a structure according to this invention in the storage position.

The ejector 24 is formed with a locking bar 30 across the ejector, and the locking bar being associated with and carrying the legs 28. The locking bar 30 will engage a base edge of the closest trapezoidal member 10 when the ejector 24 is in the locking position shown in FIG. 2. In this position locking bar 30 will span the gap formed by the ends of arms 17 of U-shaped bracket 16 to hold the U-shaped bracket and its associated trapezoidal member 10 firmly engaged until released.

Handle 34 is rotatably mounted on the box using axle 36. One end of handle 34 is rotatably attached to ejector 24 by pins 37 so that when the handle 34 is rotated, clockwise as shown in the figures, the handle will move the ejector between the locking and unlocked positions.

Various alterations and modifications will become apparent to those skilled in the art without departing from the scope and spirit of this invention and it is understood this invention is limited only by the following claims.

What is claimed is:

1. A storage container system for mounting and storing supplies under an extension on the exterior of a vehicle comprising:

a plurality of trapezoidal projections mounted on the vehicle extension, the trapezoidal projections formed with a base portion and a raised portion overlying and extending outward from the base portion, the trapezoidal projections being attached to the vehicle with the base portion juxtaposed to the vehicle;

a storage box, the storage box having a plurality of U-shaped brackets attached to one side of the box in a spaced, coaxially aligned configuration, the U-shaped brackets formed with a lip extending inwardly from the inner edge of the bracket opening to form a reduced section cross section complimentary to the raised portion of the trapezoidal projection, the U-shaped member having a tab receiving aperture formed there through, the box having at least one stud mounted to and extending from the box, the stud having a enlarged head thereon;

an ejector mounted on the box for reciprocal movement between a locking and an unlocking position, the ejector having a tab extending from the ejector so as to pass through the aperture in one U-shaped member when the ejector moves from the locking position to the unlocking position, the ejector having two legs extending from the ejector towards and engaging the stud, the ejector having a locking bar extending transverse to the direction of travel of the ejector, the locking bar being in close proximity to the open end of the U-shaped bracket when the ejector is in the locking position; and a handle member rotatably mounted on the box, one end of the handle being pivotally attached to the ejector;

whereby when the handle is rotated the ejector is moved between the locked and unlocked position to release the box from the trapezoidal members.

* * * * *